United States Patent
Ball (10) Patent No.: US 8,302,220 B2
(45) Date of Patent: *Nov. 6, 2012

(54) METHOD AND APPARATUS FOR ASSEMBLING AND SEALING BATHTUB OVERFLOW AND WASTE WATER PORTS

(75) Inventor: William T Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/732,726

(22) Filed: Dec. 10, 2003

(65) Prior Publication Data

US 2004/0117907 A1    Jun. 24, 2004

Related U.S. Application Data

(63) Continuation-in-part of application No. 09/954,420, filed on Sep. 17, 2001, now Pat. No. 6,691,411, and a continuation-in-part of application No. 10/229,533, filed on Aug. 28, 2002, now Pat. No. 6,675,406, which is a continuation of application No. 09/593,724, filed on Jun. 13, 2000, now abandoned.

(51) Int. Cl.
*E03C 1/22* (2006.01)

(52) U.S. Cl. .......................................................... 4/680

(58) Field of Classification Search .............. 4/679, 680, 4/694

See application file for complete search history.

(56) References Cited

U.S. PATENT DOCUMENTS

| | | | |
|---|---|---|---|
| 427,478 A | 5/1890 | McEvoy | |
| 843,968 A | 2/1907 | Sharp, Jr. | |
| 1,213,466 A | 1/1917 | Delanoy et al. | |
| 1,330,909 A | 2/1920 | Sharp, Jr. | |
| 1,518,599 A | 12/1924 | Murray | |
| 1,788,083 A * | 1/1931 | Church | 403/36 |
| 1,925,008 A | 8/1933 | Schacht | |
| 1,977,177 A | 10/1934 | De Flores | |
| 2,044,253 A | 6/1936 | Morris | |
| 2,062,145 A | 11/1936 | Pickop | |
| 2,223,365 A | 12/1940 | Groeniger | |
| 2,374,815 A | 5/1945 | Haas, Jr. | |

(Continued)

FOREIGN PATENT DOCUMENTS

| | | |
|---|---|---|
| CH | 346187 | 6/1960 |
| DE | 1163257 | 2/1964 |
| FR | 744099 | 4/1933 |

OTHER PUBLICATIONS

English language translation of CH 346187, 7 pgs.*

(Continued)

*Primary Examiner* — Lori Baker (74) *Attorney, Agent, or Firm* — Sheridan Ross P.C.

(57) ABSTRACT

A bathtub drainage and overflow system assembly is a combination of a one-piece overflow pipe and a waste water drain assembly connected by a T-shaped elbow. The one-piece overflow pipe has an inverted L-shape having an elbow portion. A lip extends radially outwardly from an outer surface of the overflow pipe to engage an outer surface of the bathtub end wall around the bathtub overflow port. A thin diaphragm is used to close the inlet to fluid flow. The waste water drain has an L-shaped drain pipe having an annular flange resting on a bottom wall of the bathtub.

17 Claims, 7 Drawing Sheets

U.S. PATENT DOCUMENTS

| | | | |
|---|---|---|---|
| 2,444,340 | A | 6/1948 | Donahue |
| 2,832,081 | A | 4/1958 | Young |
| 2,915,903 | A * | 12/1959 | Digby et al. .................. 74/7 R |
| 2,993,655 | A * | 7/1961 | O'Brien .................. 239/582.1 |
| 3,121,879 | A | 2/1964 | Young |
| 3,493,978 | A | 2/1970 | Hindman et al. |
| 3,937,497 | A | 2/1976 | Studer |
| D248,133 | S | 6/1978 | Shames et al. |
| 4,135,258 | A | 1/1979 | Braga et al. |
| 4,146,939 | A | 4/1979 | Izzi |
| 4,233,697 | A | 11/1980 | Cornwall |
| 4,307,901 | A | 12/1981 | Orberg et al. |
| 4,352,213 | A | 10/1982 | Watts |
| 4,359,790 | A | 11/1982 | Chalberg |
| 4,371,991 | A | 2/1983 | Schrott |
| 4,387,914 | A | 6/1983 | Paulson et al. |
| 4,413,384 | A | 11/1983 | Lassche |
| 4,553,625 | A | 11/1985 | Tsuge et al. |
| 4,683,597 | A * | 8/1987 | Taylor et al. .................. 4/295 |
| 4,730,855 | A | 3/1988 | Pelletier |
| D296,816 | S | 7/1988 | Budzinski et al. |
| 4,813,745 | A | 3/1989 | Woody |
| 4,825,477 | A | 5/1989 | Aranda |
| 4,865,353 | A | 9/1989 | Osborne |
| 4,890,967 | A * | 1/1990 | Rosenbaum .................. 411/377 |
| 4,920,582 | A | 5/1990 | Alker |
| 4,953,235 | A | 9/1990 | Cornwall |
| 5,025,509 | A * | 6/1991 | Holt et al. .................. 4/694 |
| 5,257,648 | A | 11/1993 | Oropallo |
| 5,267,474 | A * | 12/1993 | Ten Hoven .................. 73/290 R |
| 5,273,077 | A | 12/1993 | Oropallo |
| 5,350,266 | A * | 9/1994 | Espey et al. .................. 411/431 |
| 5,351,996 | A | 10/1994 | Martin |
| 5,377,361 | A | 1/1995 | Piskula |
| 5,417,460 | A | 5/1995 | Lunder |
| 5,507,501 | A | 4/1996 | Palmer |
| 5,590,916 | A | 1/1997 | Liu |
| 5,692,248 | A | 12/1997 | Ball |
| 5,745,931 | A | 5/1998 | Ball |
| 5,786,054 | A | 7/1998 | Platusich et al. |
| 5,799,986 | A | 9/1998 | Corbett et al. |
| 5,815,895 | A | 10/1998 | Carlson et al. |
| 5,890,241 | A | 4/1999 | Ball |
| 5,957,514 | A | 9/1999 | Brookshire |
| 5,971,438 | A | 10/1999 | Johnson |
| 6,058,526 | A | 5/2000 | Parisi et al. |
| 6,073,278 | A | 6/2000 | Ball |
| 6,085,363 | A | 7/2000 | Huber |
| 6,088,843 | A | 7/2000 | Francisco |
| 6,126,233 | A | 10/2000 | Gaetano et al. |
| 6,145,136 | A | 11/2000 | Parisi et al. |
| 6,192,531 | B1 | 2/2001 | Fritz et al. |
| 6,193,879 | B1 | 2/2001 | Bowman |
| 6,216,288 | B1 | 4/2001 | Bernau |
| 6,263,518 | B1 | 7/2001 | Magtanong |
| 6,289,532 | B1 | 9/2001 | Fritz et al. |
| 6,295,664 | B2 | 10/2001 | Fritz et al. |
| 6,338,168 | B1 | 1/2002 | Valentine |
| 6,362,734 | B1 | 3/2002 | McQuade et al. |
| 6,448,907 | B1 | 9/2002 | Naclerio |
| 6,484,331 | B2 | 11/2002 | Minnick |
| 6,530,722 | B1 | 3/2003 | Shaw et al. |
| 6,546,573 | B1 | 4/2003 | Ball |
| 6,606,753 | B2 | 8/2003 | Minnick |
| 6,618,875 | B1 * | 9/2003 | Oropallo et al. .................. 4/694 |
| 6,637,050 | B1 * | 10/2003 | Ball .................. 4/680 |
| 6,675,406 | B2 | 1/2004 | Ball |
| 6,691,411 | B2 | 2/2004 | Ball |
| 6,696,943 | B1 | 2/2004 | Elrod et al. |
| 6,812,844 | B1 | 11/2004 | Burgess |
| 6,836,911 | B2 | 1/2005 | Minnick |
| 6,953,049 | B2 | 10/2005 | Kowalke |
| D517,666 | S | 3/2006 | Wilk, Jr. et al. |
| D523,123 | S | 6/2006 | Wilk, Jr. et al. |
| 7,127,752 | B2 | 10/2006 | Ball |
| 7,237,280 | B1 | 7/2007 | Holden et al. |
| 7,300,074 | B1 | 11/2007 | Paulson |
| D586,433 | S | 2/2009 | Price et al. |
| D627,863 | S | 11/2010 | Ball |
| D636,468 | S | 4/2011 | Ball |
| D637,696 | S | 5/2011 | Ball |
| 8,028,357 | B2 | 10/2011 | Ball |
| D665,062 | S | 8/2012 | Ball |
| 2001/0002494 | A1 | 6/2001 | Fritz et al. |
| 2002/0032926 | A1 | 3/2002 | Lewis |
| 2002/0112285 | A1 | 8/2002 | Minnick |
| 2003/0151281 | A1 | 8/2003 | Williams |
| 2004/0068793 | A1 | 4/2004 | Ball |
| 2004/0111797 | A1 | 6/2004 | Ball |
| 2006/0085907 | A1 | 4/2006 | Ball |
| 2007/0007763 | A1 | 1/2007 | Deaton |
| 2008/0148477 | A1 | 6/2008 | Shafik |
| 2008/0155745 | A1 | 7/2008 | Burr |
| 2008/0196161 | A1 | 8/2008 | Ball |
| 2009/0261579 | A1 | 10/2009 | Spears |

OTHER PUBLICATIONS

"WCM Industries—Freezeless Faucets, Yard Hydrants and Bath Wastes", as early as Aug. 2000, available at http://www.woodfordmfg.com/, printed on Sep. 15, 2005, p. 1.
"New WATCO Eliminator Bath Waste", WATCO, as early as Aug. 8, 2001, pp. 1-2.
"Tubular Plastic-Innovator® 590", Woodford Manufacturing Company, first sold Aug. 16, 2001, pp. 1-2.
Office Action for U.S. Appl. No. 10/674,862, mailed Mar. 28, 2005.
Office Action for U.S. Appl. No. 10/674,862, mailed Aug. 18, 2004.
Notice of Allowance for U.S. Appl. No. 10/674,862, mailed Aug. 24, 2006.
Office Action for U.S. Appl. No. 10/674,862, mailed Oct. 6, 2005.
Office Action for U.S. Appl. No. 10/674,862, mailed Sep. 20, 2005.
Official Communication for U.S. Appl. No. 10/674,862, mailed May 23, 2008.
Examiner's Answer for U.S. Appl. No. 10/674,862, mailed May 15, 2008.
Office Action for U.S. Appl. No. 10/674,862, mailed May 1, 2007.
Office Action for U.S. Appl. No. 10/674,862, mailed Dec. 21, 2006.
Notice of Allowance for U.S. Appl. No. 10/738,772, mailed Aug. 1, 2006.
Notice of Allowance for U.S. Appl. No. 10/738,773, mailed May 11, 2006.
Notice of Allowance for U.S. Appl. No. 10/738,772, mailed Mar. 27, 2006.
Notice of Allowance for U.S. Appl. No. 10/738,772, mailed Aug. 2, 2005.
Notice of Allowance for U.S. Appl. No. 10/738,772, mailed May 13, 2005.
Notice of Allowance for U.S. Appl. No. 10/738,772, mailed Mar. 11, 2005.
Notice of Allowance for U.S. Appl. No. 10/738,772, mailed Sep. 17, 2004.
Office Action for U.S. Appl. No. 10/738,765, mailed May 22, 2007.
Office Action for U.S. Appl. No. 10/738,765, mailed Jan. 13, 2006.
Office Action for U.S. Appl. No. 10/738,765, mailed Jun. 6, 2005.
Office Action for U.S. Appl. No. 10/738,765, mailed Apr. 13, 2006.
Notice of Allowability for U.S. Appl. No. 29/362,288, mailed Oct. 7, 2010.
Official Action for U.S. Appl. No. 12/057,660, mailed Nov. 3, 2011 9 pages.
definition of the term "diaphragm" found at: http://www.thefreedictionary.com/diaphragm, cited in Aug. 7, 2012 OA for U.S. Appl. No. 13/234,030.
Notice of Allowance for U.S. Appl. No. 12/057,660, mailed Mar. 7, 2012 5 pages.
Official Action for U.S. Appl. No. 29/378,602, mailed Mar. 9, 2012 6 pages Restriction Requirement.
Official Action for U.S. Appl. No. 29/378,602, mailed Mar. 27, 2012 5 pages.
Notice of Allowance for U.S. Appl. No. 29/378,602, mailed Jun. 21, 2012 7 pages.
Official Action for U.S. Appl. No. 13/234,030, mailed Aug. 7, 2012 13 pages.

* cited by examiner

METHOD AND APPARATUS FOR ASSEMBLING AND SEALING BATHTUB OVERFLOW AND WASTE WATER PORTS

CROSS REFERENCE TO A RELATED APPLICATION

This application is a continuation-in-part of U.S. patent application Ser. No. 09/954,420, filed Sep. 17, 2001, that matured into U.S. Pat. No. 6,691,411 and a continuation-in-part of U.S. patent application Ser. No. 10/229,533, filed Aug. 28, 2002, that matured into U.S. Pat. No. 6,675,406 which was a continuation of abandoned U.S. patent application Ser. No. 09/593,724, filed Jun. 13, 2000.

BACKGROUND OF THE INVENTION

In constructing a bathtub, both the waste water drain assembly and overflow outlet must be designed to allow easy installation and testing of the bathtub. The traditional method of installing a waste water drain assembly for a bathtub is well established, and generally, is considered a two-person job. Not only is the process somewhat cumbersome and difficult, requiring pieces to be held in place while assembled, but it also creates obstacles to field testing the drain assemblies for leaks where testing is required. Likewise, the traditional method requires the removal of a strainer body in order to replace finished materials.

After installation, the plumbers prefer not to put the finished closure valves in the bottom of tubs, or the finished decorative plate over the overflow outlet at the end of the tub until the project is finished. The plumbers prefer this because these elements will often be damaged as the construction project is brought to a close.

Piping for both of the outlets needs to be checked for leaks before the inspection process is completed. This test involves running water down a vent attached to the drain until the water reaches a level above the tub. The tester then determines whether any of the piping leaks. Thus, when the testing operation is to take place, a plug is put in the bottom drain of the tub and some sort of seal plate is placed at the end of the tub on the overflow outlet.

Existing overflow plates have a center opening therein. There are either two or four small screw holes in the plate adjacent to the center opening. These screw holes are used to hold the plate to the plumbing fixture. The testing procedure usually involves stuffing a balloon through the large center opening into the pipe in the wall. The pipe is sealed when the balloon is inflated. Further, existing seal plates normally have to be removed when the decorative plate is put on.

It is therefore, an object of the invention to provide an easier method to install a drain assembly that can be accomplished by a single individual.

An additional object is to provide a method that accommodates ease of field testing, ease in replacing finished parts, and reduction in the amount of material that requires special finishing.

It is therefore, an object of the invention is to provide easier method to install a drain assembly that can be accomplished by a single individual.

An additional object is to provide a method that accommodates ease of field testing, ease in replacing finished parts, and reduction in the amount of material that requires special finishing.

The primary object of the invention is to provide a method of installing a drain assembly that can be accomplished by a single individual.

A further object of the invention is to provide a method of installing a drain assembly that is easy to install and allows for ease in field testing for leaks.

Another objective of the present invention is to provide a method of installing a drain assembly that eliminates the need for the removal of the strainer body in order to replace finished parts.

A still further object of the present invention is to provide a method that reduces the number of parts that require special finishing.

It is another object of this invention to provide an overflow fitting which will safeguard the overflow system during construction.

A further object of the invention is to provide an overflow fitting which will prepare the overflow system for testing.

A still further object of the invention is to provide an overflow fitting which allows a user to install the overflow fitting without using solvent cement.

These and other objects will be apparent to those skilled in the art.

BRIEF SUMMARY OF THE INVENTION

A bathtub drainage and overflow system assembly is a combination of a one-piece overflow pipe and a waste water drain assembly connected by a T-shaped elbow. A one-piece overflow fitting is provided for a bathtub having a one piece overflow pipe. The one piece overflow pipe has an inverted L-shape having an elbow portion defining an upper end portion and a lower end portion. The upper end portion has an outer end defining an inlet adapted to fit through a bathtub overflow port. Threads are located on an outer surface of the upper end portion and surround the inlet. A lip extends radially outwardly from an outer surface of the overflow pipe between the elbow portion and the upper end portion to engage an outer surface of the bathtub end wall around the bathtub overflow port. A thin diaphragm is sealed to the outer end of the upper end portion to close the inlet to fluid flow.

The waste water drain has an L-shaped drain pipe having an upper end with an annular flange covered by a membrane, an inner end, and a threaded portion near the upper end, through a drain hole of a bathtub, such that the annular flange rests on a bottom wall of the bathtub. A lock washer can be slidably mounted over the inner end of the drain pipe to the threaded portion, and then can be threadably tightened against a lower surface of the bottom wall of the bathtub. The outer end of the L-shaped drain pipe is then connected to a T-shaped elbow to combine the drain and overflow systems.

DETAILED DESCRIPTION OF THE INVENTION

Figure 1:
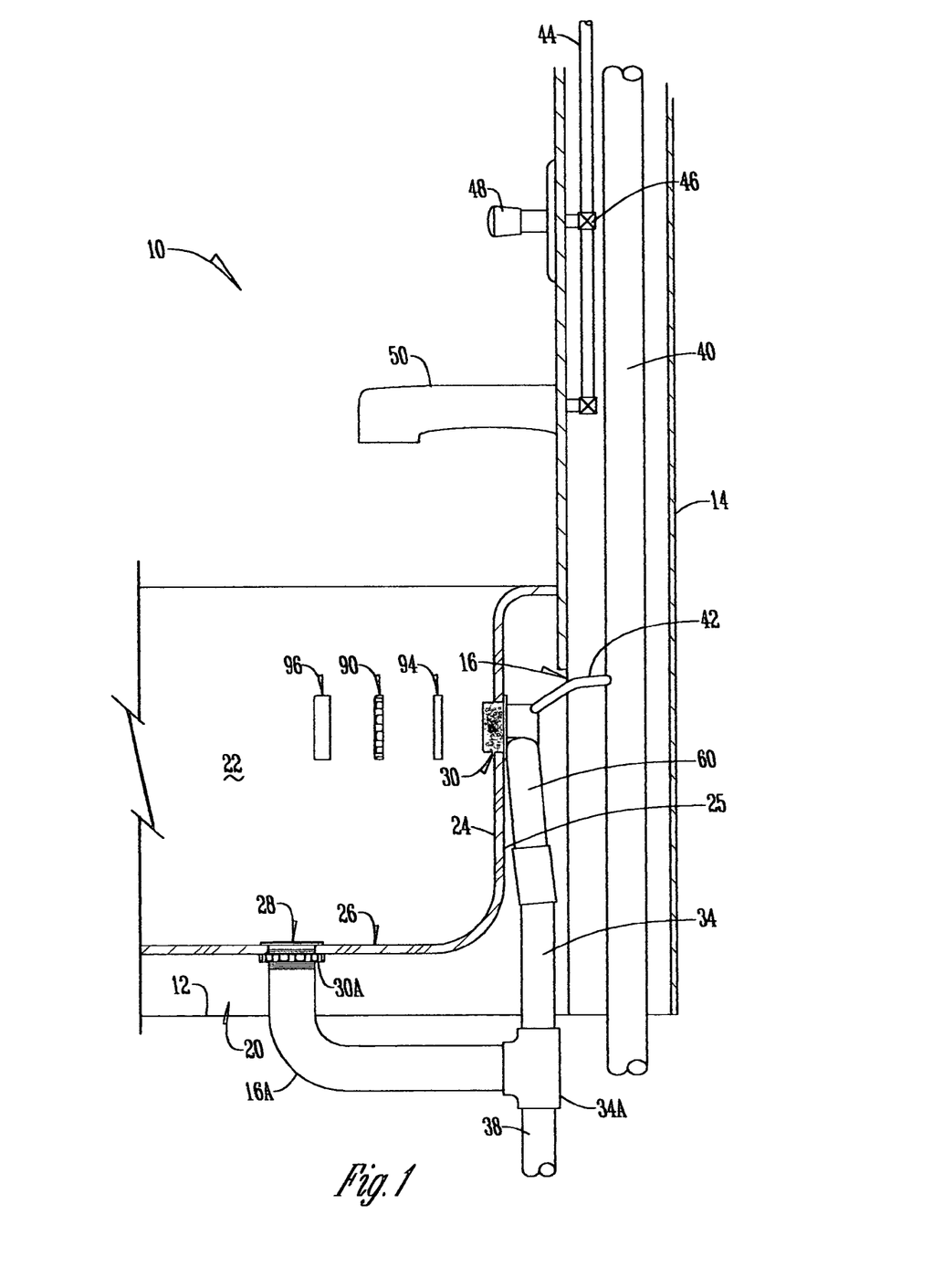
FIG. 1 is a sectional side view of a conventional bathtub environment utilizing the device of this invention.

With reference to FIG. 1, a conventional bathroom structure 10 has a floor 12, and a hollow wall 14 with a wall opening 16 therein. A conventional bathtub (hereinafter "tub") 20 rests upon floor 12.

The tub 20 has side walls 22, end walls 24, and a bottom 26. The side walls 22 extend upwardly from the bottom 26. The end walls 24 extend upwardly from the bottom 26, perpendicular to the side walls 22, and have an outer surface 25.

A drain port 28 is located in the bottom 26. A conventional overflow port 30 is located in the end wall 24. A drain pipe 16A extends downwardly from drain port 28. A second vertical drain pipe 34 extends downwardly from the overflow port 30. The drain pipe 16A connects drain port 28 and drain system 34A. A primary drain pipe 38 extends downwardly from the drain system 34A, seen in FIG. 1 as a T-shaped elbow.

A conventional vertical vent pipe 40 is located within the hollow wall 14. A connector vent pipe 42 is in fluid flow communication with the vent pipe 40 and the upper end of the second vertical drain pipe 34.

Conventional water pipes 44 extend through hollow wall 14 and are connected to a valve 46. The valve 46 is interconnected with conventional control members 48 and faucet 50. A one-piece overflow fitting 60 is attached to the second vertical drain pipe 34, and a portion of the overflow fitting 60 passes through overflow port 30.

Figure 2:
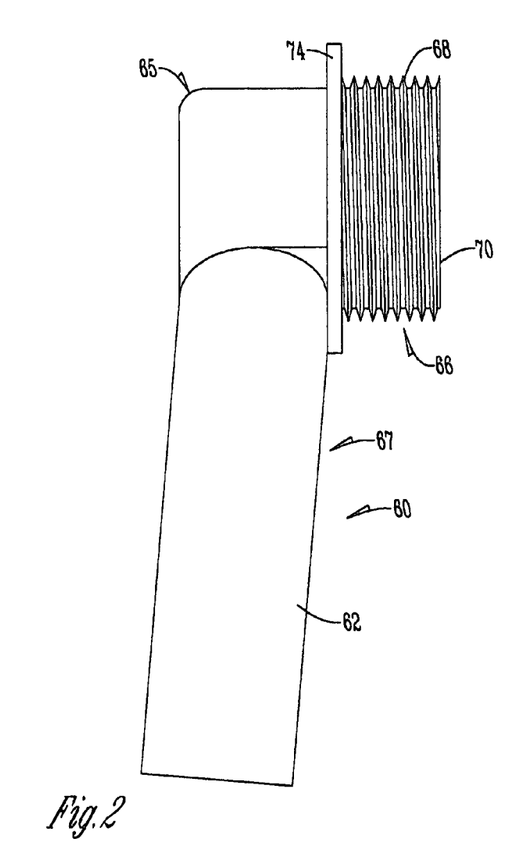
FIG. 2 is a side view of the device of this invention.
Figure 3:
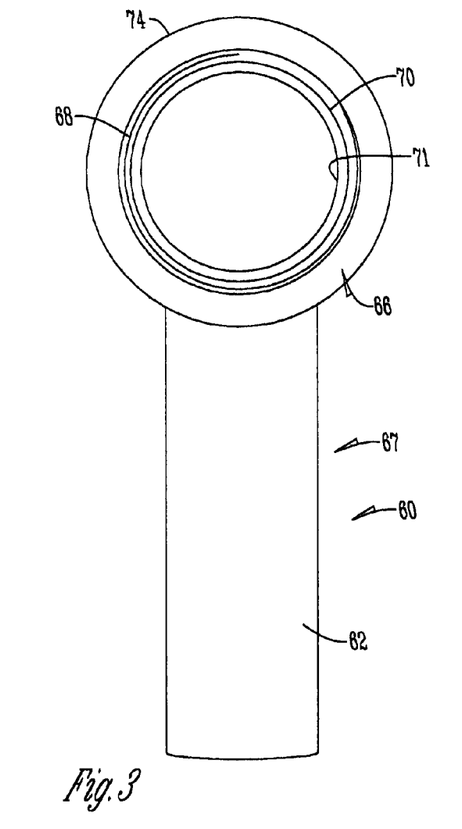
FIG. 3 is a front view of the device of this invention.
Figure 4:
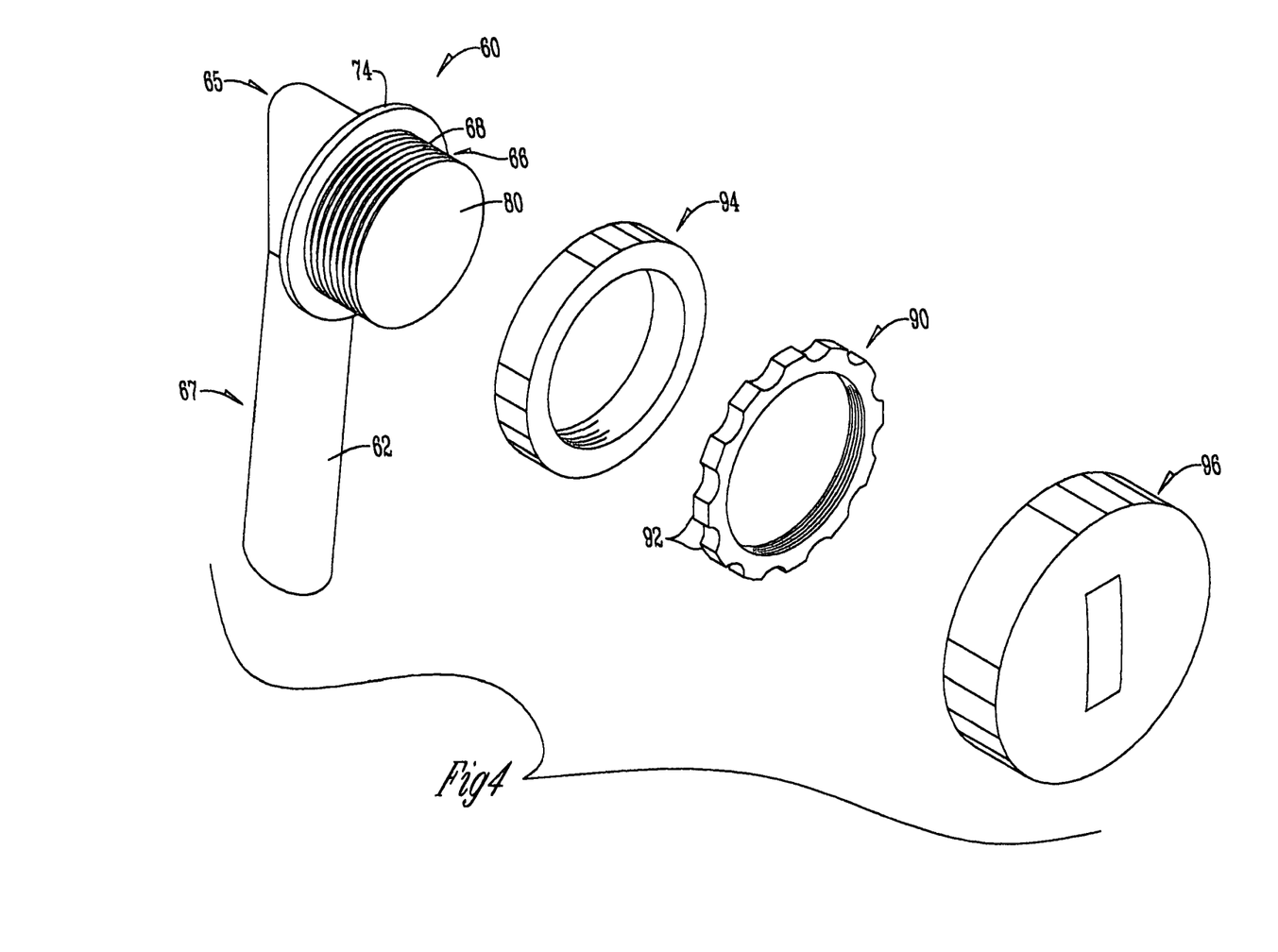
FIG. 4 is an exploded perspective view of the device of this invention.

With reference to FIGS. 2-4, the overflow fitting 60 has an overflow pipe 62 with an inverted L-shape. The overflow pipe 62 has an elbow portion 65 which defines an upper end portion 66 and a lower end portion 67. It will be understood that the overflow pipe 62 may be made of copper, plastic, or any other suitable material.

The upper end portion 66 has threads 68 on its outer surface and also has an outer end 70. The outer end 70 defines an inlet 71 to the upper end portion 66 of the overflow pipe 62. The inlet 71 is adapted to fit through the bathtub overflow port 30.

The overflow fitting 60 also has a lip 74 extending radially outwardly from an outer surface of the overflow pipe 62 between the elbow portion 65 and the upper end portion 66. The lip 74 is spaced from the inlet 71 to engage an outer surface 25 of the bathtub end wall 24 around the bathtub overflow port 30, thereby allowing only the upper end portion 66 to pass through the overflow port 30.

A thin diaphragm 80 is sealed to the outer end 70 of the end portion 66. The diaphragm 80 is a circular membrane and has a diameter that is not less than the diameter of the outer end 70 of the overflow pipe 62. In one embodiment, the diaphragm 80 is integral with the outer end 70 and is held to the outer end 70 only through having been integrally formed therewith. The diaphragm 80 may be hermetically sealed to the outer end 70. The diaphragm 80 may be composed of plastic material, flexible rubber, or the like. The diaphragm 80 is composed of a material that is easily punctured or easily removable.

Referring to FIGS. 1 and 4, the overflow pipe fitting 60 further includes, a nut element 90 having threads compatible with the threads 68 on the upper end portion 66 of the overflow pipe 62. The nut element 90 removably secures the overflow pipe 62 to the bathtub 20 by compressing the end wall 24 between the nut element 90 and the lip 74. The nut element 90 may be a slip nut.

As shown in FIG. 4, the nut element 90 has a series of radially extending lugs 92 along the nut 90 outer periphery to constitute a single-piece unit. These lugs 92 detachably engage the inner surface of a cap 96. The cap 96 serves to cover the overflow pipe fitting 60 hardware. The cap 96 of one embodiment of the present invention includes a surface, which is bounded by a sidewall, that is positioned within the bathtub.

During installation of the overflow pipe fitting 60, a washer 94 may be placed between the upper end portion 66 of the overflow pipe 62 and the nut element 90. The washer 94 seals the overflow pipe fitting 60 to the tub 20.

Figure 6:
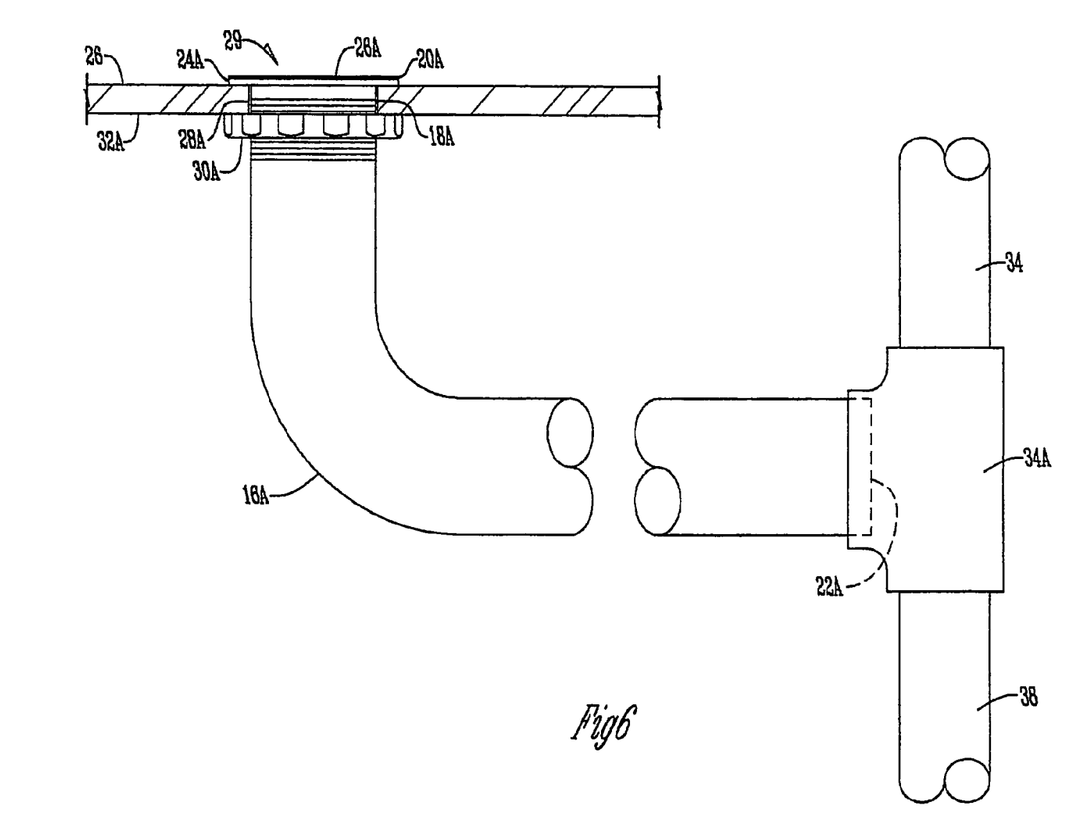
FIG. 6 is a side view of the installed drain assembly.
Figure 7:
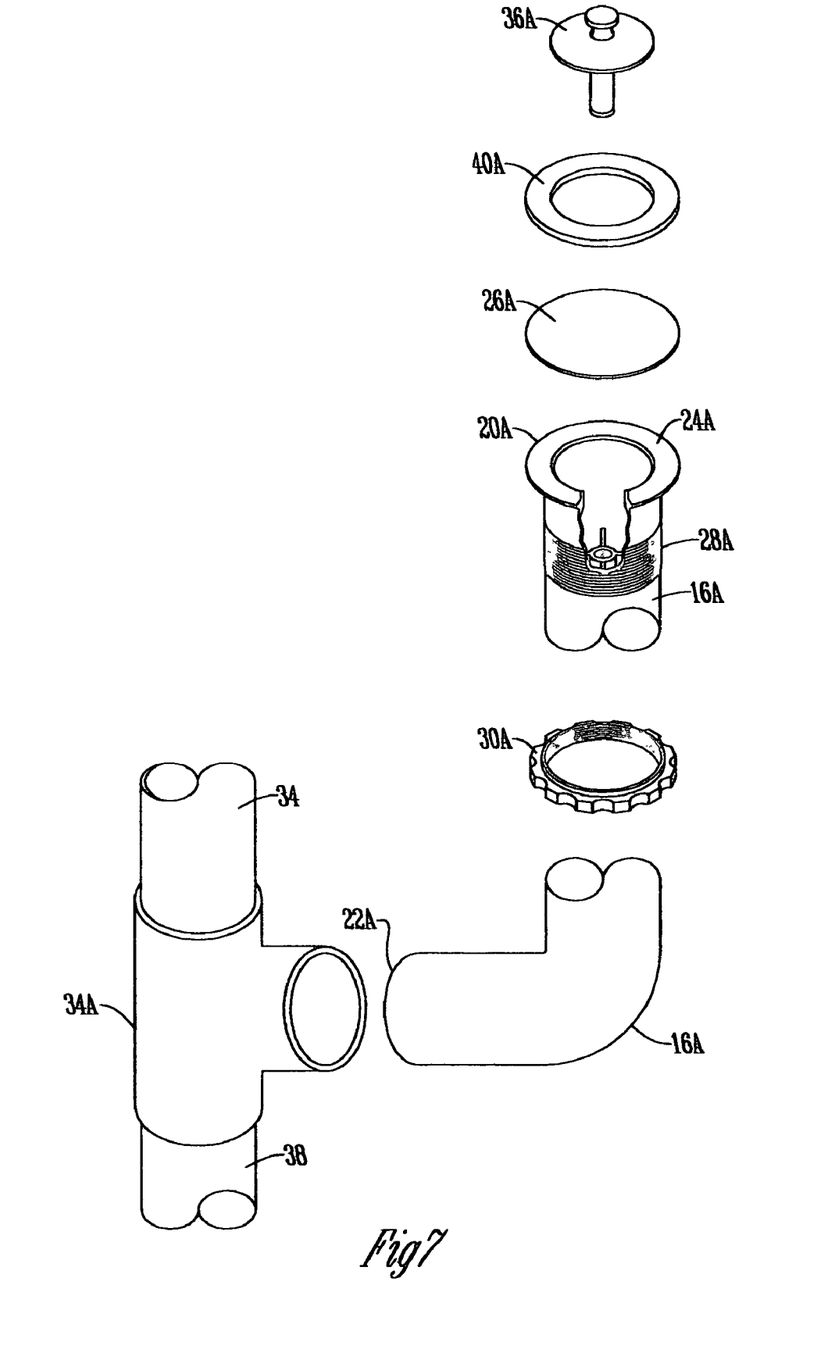
FIG. 7 is an exploded perspective view of the drain assembly.

Referring to FIG. 6, when installing the waste water drain 29, the method begins by inserting a generally L-shaped drain pipe 16A through a drain hole 18A on the bottom wall 26 of the bathtub 20. The drain pipe 16A has both an upper end 20A and an inner end 22A. The upper end terminates in an annular flange 24A and in one embodiment is covered by a membrane 26A. Membrane 26A in one embodiment is a flat planar membrane of continuous construction that dwells in a single plane. Also, near the upper end 20A of the drain pipe 16A is a threaded portion 28A. The drain pipe 16A is inserted into the drain that the annular flange 24A rests on the bottom wall 26 of the bathtub 20. A sealant material is placed on a lower surface of the annular flange 24A for securing the annual flange to the bottom wall 26 of the bathtub 20.

Next, a lock washer 30A is slidably mounted over the inner end 22A of the drain pipe 16A until it reaches the threaded portion 28A near the upper end 20A of the drain pipe 16A. There, lock washer 30A, which is threadably received on the threaded portion 28A, is tightened against the lower surface 32A of the bottom wall 26 of the bathtub 20.

Once the lock washer 30A is tightened, the inner end 22A of the drain pipe 16A is connected to a T-shaped elbow 34A. Once connected, the drain assembly and drain system are tested for water leaks. When it is determined that there are no leaks, the membrane 26A is removed from the flange 24A on the upper end 20A of the drain pipe 16A.

Once the drain closure 36A is installed, a cover 40A can be placed on the flange 24A of the upper end 20A of the drain pipe 16A. In the preferred embodiment, the cover 40A frictionally engages the flange 24A.

Then, a drain closure 36A is installed into the upper end 20A of the drain pipe 16A. The drain closure 36A can be of any conventional type, including lift and turn, foot actuated, or PUSH-PULL™ closures. Likewise, a PRESFLO™ drain closure such as the one described in U.S. Pat. No. 4,457,030 by Burry can be installed. Crossbars can be snapped into the upper end 20A of the drain pipe 16A to assist in securing the drain closure 36A depending upon the type of drain closure used. The ability to snap in the crossbars minimizes the difficulty in repairing stripped out threads used in some conventional drain closures.

Because the drain assembly is installed with new construction where the tub is in place and there is no drywall on the open interior wall 14, a single individual is capable of holding the drain pipe 16A in place while the lock washer is slidably mounted on the drain pipe and tightened on the threaded portion 28A, thus eliminating the need for multiple individuals for installation.

In operation, the drainage system, T-shaped elbow 34A; the ports 28 and 30; pipes 34, 38; and the overflow pipe fitting 60 are installed as shown in FIG. 1. Vertical vent pipe 40 and connector vent pipe 42 are also installed.

In the testing procedure, the port 28 is plugged in any conventional manner. The overflow pipe fitting 60 is attached to the second vertical drain pipe 34 already plugged by the diaphragm 80 as described above, so there is no fluid access to the upper end of pipe 34 either inwardly or outwardly out of the overflow port 30. The vertical vent pipe 40 is charged with water at some elevation above pipe 42 so that it can be determined if there are any leaks in the system.

Figure 5:
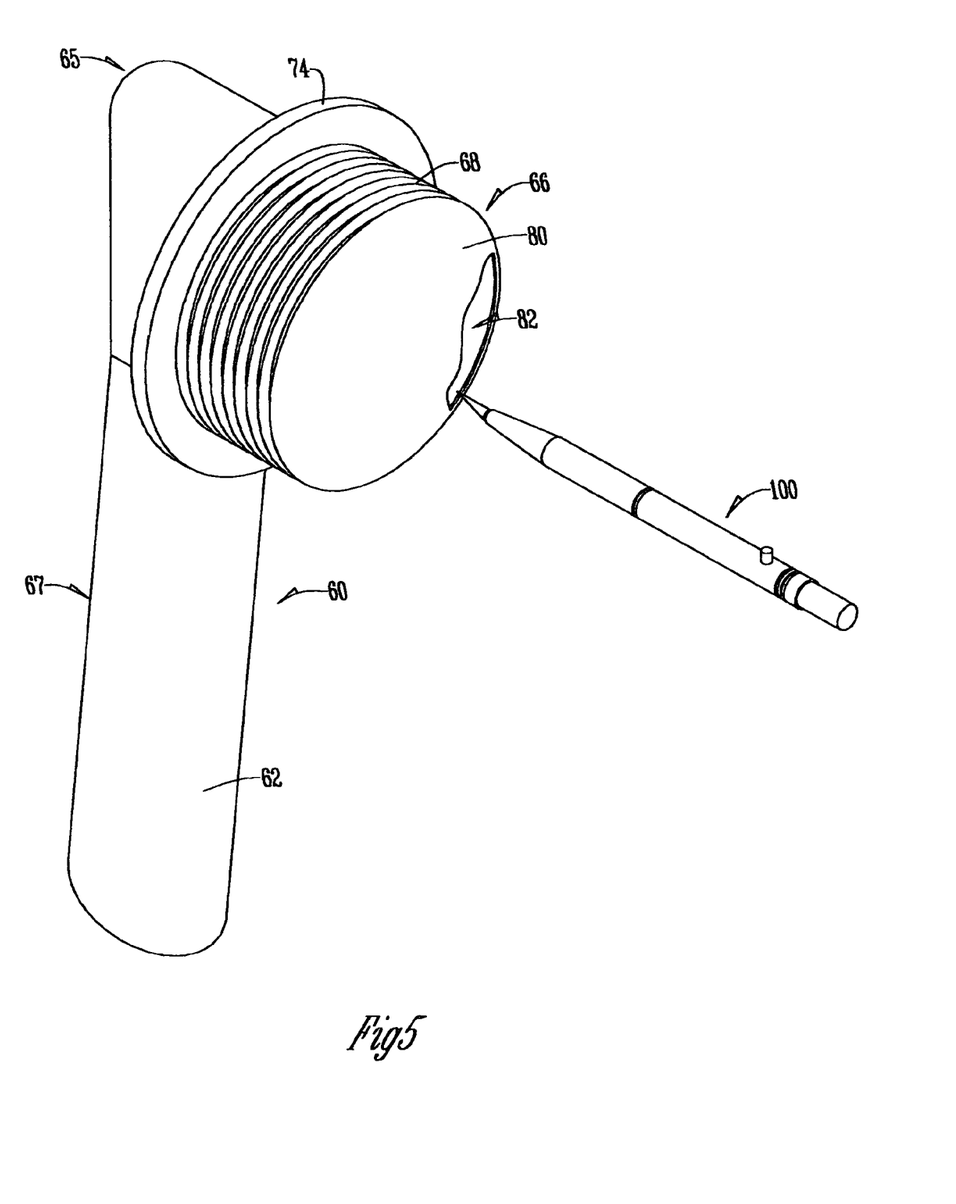
FIG. 5 is a perspective view of the installation of the device of this invention.

With reference to FIG. 5, having determined that there are no leaks, the water is purged from the system. The plumber can then approach overflow port 30, and by using a cutting device 100, such as a knife of any other sharp object, cuts 82 can be made in the diaphragm 80. This can be quickly and easily done without disassembling any of the structure of overflow pipe fitting 60. Any valve linkage elements required may be installed through cuts 82, and any cap or cover for the overflow port 30 may be placed over the overflow pipe 62 end portion 66.

Furthermore, during testing this invention eliminates any need to seal shut the overflow pipe 62 after the pipe 62 has been attached to the second vertical drain pipe 34. The invention also eliminates any need to remove sealing components from the overflow port 30 after the testing procedure has taken place. In addition, the invention allows a user to install the overflow fitting 60 without using solvent cement.

Figure 8:
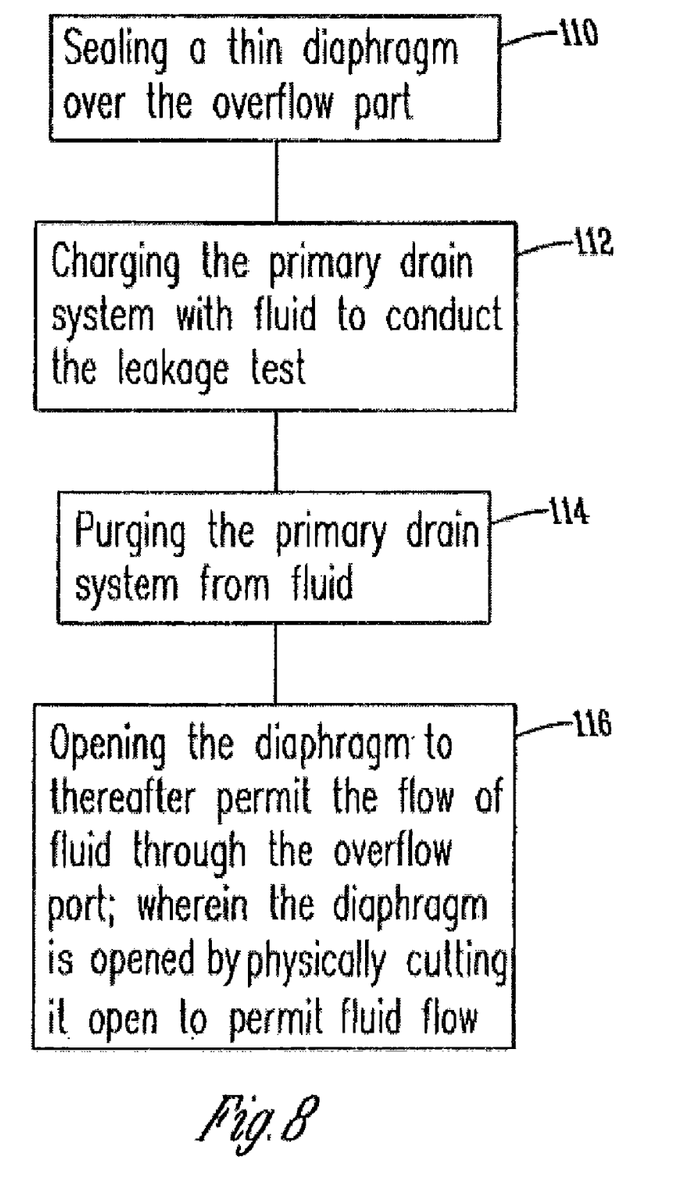
FIG. 8 is a flow chart of a method for conducting a fluid leak test on a fluid system.

FIG. 8 shows a flow chart of a method for conducting a fluid leak test on a fluid system comprising a bathtub 20 which has a bottom 26 and adjacent and end wall 24, and an overflow port 30 in an end wall 24 with the bottom 26 having a waste water drain 29, and with the overflow port 30 and the waste water drain 29 being in communication with a primary drain system 34A. The steps comprise sealing a diaphragm 80, 26A over the overflow port 30 and the waste water drain 29 as shown in box 110. Then, charging the primary drain system 34A with fluid to conduct the leakage test as shown in box 112. The next step involves purging the primary drain system 34A of fluid, as shown in box 114. The step shown in box 116 involves opening the diaphragm 26A to thereafter permit the flow of fluid through the overflow port 30. The final step is wherein the diaphragm 26A is opened by physically cutting it open to permit fluid flow as shown in box 118.

This method can also include wherein the waste water drain 29 is connected to the primary drain system 34A by providing a generally L-shaped drain pipe 16A having a hollow upstanding portion with an open upper end 20A and a horizontal portion with an open inner end 27A with the upstanding horizontal portion being connected by an L-shaped portion. This method includes placing a horizontal flange 24A around the upper end 20A of the upstanding portion. The next step is providing external threads 28A on the outside surface of the upstanding portion; inserting the open inner end 22A of the horizontal portion downwardly through a drain opening 18A in a tub 20 which has a diameter greater than a diameter of the upstanding portion but less than a diameter of the flange so that the flange engages a portion of the bathtub around the drain opening. Then, the method includes inserting a threaded lock washer 30A with an internally threaded center bore over the inner end 22A of the horizontal portion wherein the center bore of the lock washer 30A has a diameter greater than an outside diameter of the horizontal portion, the L-shaped portion and the upstanding portion. Another step involves sliding the lock washer 30A over the L-shaped drain pipe 16A until it engages the external threads on the upstanding portion and tightening the lock washer 30A against a portion of the tub around and underneath the drain opening 18A in the tub to seal the flange 24A tightly against the tub around the drain opening 18A. Finally, the method is completed by connecting the open inner end 22A of the horizontal portion to the waste water drain pipe 16A.

As can be seen from the foregoing disclosure, the present invention provides an easy method of installing a drain assembly for a bathtub by a single individual that makes it easier to test for leaks, easier to replace the finished materials without requiring the removal of the strainer body, and reduces the amount of material that requires special finishing.

Having described the preferred embodiment, it will become apparent that various modifications can be made without departing from the scope of the invention, as defined in the accompanying claims. It is therefore seen that this invention will accomplish at least all of its stated objectives.

What is claimed is:

1. An overflow assembly adapted for interconnection to a bathtub, which has a bottom, side walls, end walls, and an overflow port in one end wall, comprising:
   an overflow pipe with an elbow portion defining an upper end portion and a lower end portion, said upper end portion having an outer end defining an inlet and having threads on an outer surface thereof;
   a lip extending radially outwardly from said outer surface of the overflow pipe between said elbow portion and said upper end portion and being spaced from the inlet;
   a sealing element associated with said outer end that closes said inlet to fluid flow;
   a nut element with a threaded portion that is compatible with said threads associated with said inlet for mounting said nut element to said upper end portion, said nut element having a plurality of lugs extending radially from said nut element wherein said nut element and said plurality of lugs constitute a single-piece unit; and
   a cap detachably interconnected to at least one of said plurality of lugs and covering the nut.

2. The assembly of claim 1, wherein the overflow pipe and sealing element is of one-piece construction.

3. The assembly of claim 1, further including a washer that cooperates with said nut and said lip to interconnect to said overflow pipe to the bathtub.

4. The assembly of claim 1, wherein said sealing element is a diaphragm that is adapted to be selectively cut to provide a flow path through said overflow pipe.

5. The assembly of claim 1, wherein said sealing element has a diameter that is not less than the diameter of said threaded portion of said overflow pipe.

6. The assembly of claim 1, wherein said sealing element is circular, has a diameter that is not less than the diameter of said outer end of said outlet pipe, and is removable.

7. An overflow assembly adapted for interconnection to a bathtub, which has a bottom, side walls, end walls, and an overflow port in one end wall, comprising:
   an overflow pipe with an elbow portion defining an upper end portion and a lower end portion, said upper end portion having an outer end defining an inlet, said upper end portion having threads on an outer surface thereof;
   a lip extending radially outwardly from said outer surface of the overflow pipe between said elbow portion and said upper end portion and being spaced from said inlet;
   a means for sealing associated with said outer end that closes said inlet to fluid flow;
   a nut element with a threaded portion that is compatible with said threads of said overflow pipe for threadingly mounting said nut element to said upper end portion, said nut element having a series of retention lugs spaced about a longitudinal axis defined by said nut element, wherein there is a gap between each retention lug; and
   a cap detachably interconnected to at least one of said series of retention lugs.

8. The assembly of claim 7, wherein said overflow pipe and said means for sealing is a one-piece construction.

9. The assembly of claim 7, wherein said gaps possess an innermost surface having an arcuate shape.

10. The assembly of claim 7, wherein said means for sealing is a diaphragm.

11. The assembly of claim 10 wherein said diaphragm is adapted to be selectively cut to provide a fluid flow path through said overflow pipe.

12. An overflow assembly adapted for interconnection to a bathtub, which has a bottom, side walls, end walls, and an overflow port in one end wall, comprising:
   an overflow pipe with an elbow portion defining an upper end portion and a lower end portion, said upper end portion having an outer end defining an inlet, said upper end having threads on an outer surface thereof;
   a lip extending radially outwardly from said outer surface of the overflow pipe between said elbow portion and said upper end portion and being spaced from said inlet;
   a nut element with a threaded portion that is compatible with said threads of said overflow pipe, said nut element having an outer periphery with a series of radially extending lugs that detachably engage an inner surface of a cap that fits over said nut.

13. The assembly of claim 12, wherein said nut element and said radially extending lugs constitute a single-piece unit.

14. The overflow assembly of claim 12, further comprising a sealing element associated with said outer end that closes the inlet to fluid flow.

15. The assembly of claim 14, wherein said sealing element is a diaphragm that is adapted to be selectively cut to provide a flow path through said overflow pipe.

16. The overflow assembly of claim 12, further comprising a means for preventing fluid flow through said overflow pipe that is associated with said threaded portion, said means for preventing fluid flow sealing said inlet.

17. The assembly of claim 16, wherein said means for preventing fluid flow is a selectively removable diaphragm.

* * * * *